Patented June 17, 1947

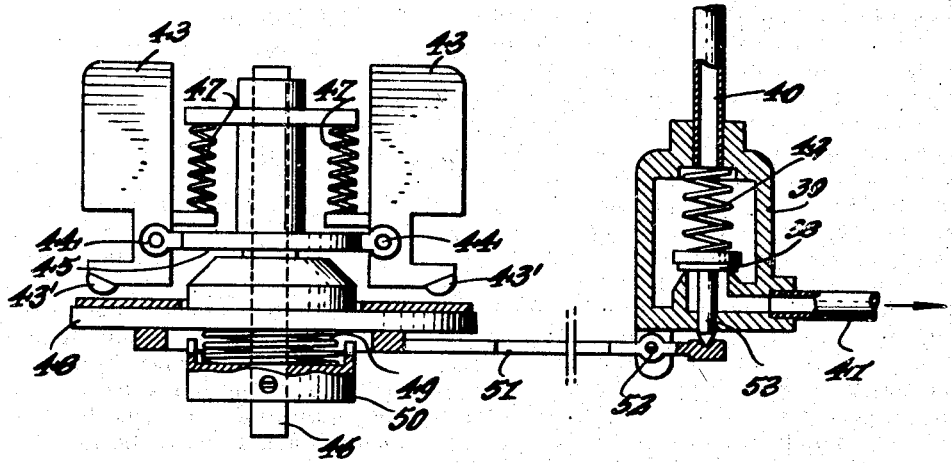
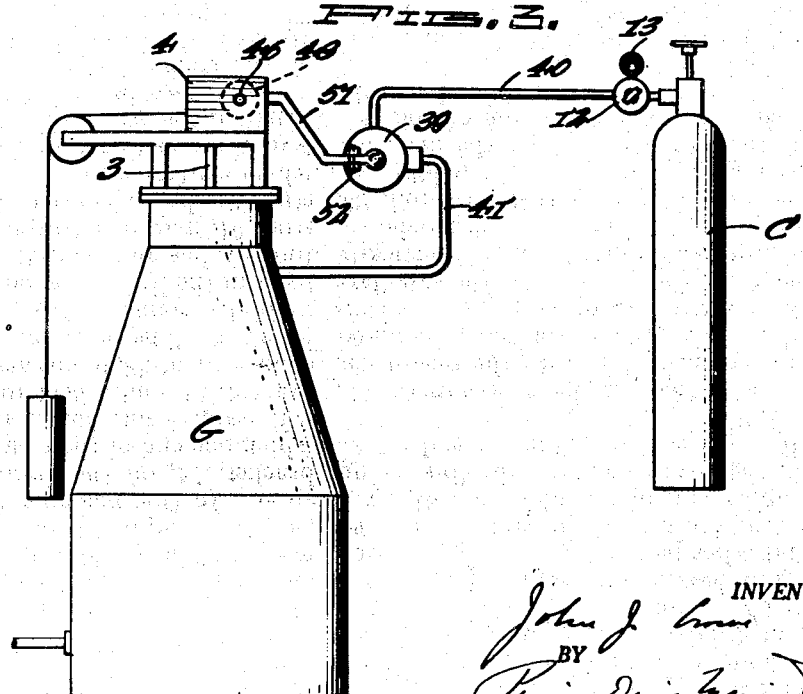

2,422,225

UNITED STATES PATENT OFFICE 2,422,225

APPARATUS FOR RAISING THE DISASSOCIATION PRESSURE OF ACETYLENE IN GENERATORS

John J. Crowe, Westfield, N. J., assignor to Air Reduction Company, Incorporated, a corporation of New York Application January 1, 1945, Serial No. 571,000

8 Claims. (Cl. 48—38)

This application relates to improvements in acetylene generators, and more particularly to apparatus for automatically introducing into the generator propane gas, or its equivalent, in such a way as to maintain in admixture with the acetylene in the generator approximately a predetermined percentage of the propane or other gas.

It is possible for acetylene to explode without the presence of any air or oxygen. When the pressure of the gas is sufficiently high, a point of high temperature anywhere in the mass of acetylene will cause a disassociation of the gas into hydrogen and carbon, and possibly some polymers, with explosive violence.

For any given temperature of the acetylene there is a pressure below which disassociation will not occur. This pressure, known as the "disassociation pressure" is about 8 pounds per square inch when the temperature of the acetylene is 70° F. If propane is mixed with the acetylene, the "disassociation" pressure of the acetylene is raised, and certain other gases have a similar effect. As little as 10% of propane will raise the disassociation pressure of the acetylene from 8 pounds per square inch to approximately 17 pounds per square inch at 70° F. Therefore, if propane is introduced into the acetylene generator so that there is maintained within the generator a mixture of acetylene and propane containing around 10% of propane, the hazard from generator explosions is greatly reduced.

The principal object of this invention is to provide apparatus for automatically introducing propane gas or its equivalent into the acetylene generator in such a way that there is always maintained admixed with the acetylene a quantity of the introduced gas sufficient to reduce the explosion hazard.

Several forms of apparatus embodying the invention are illustrated in the accompanying drawings, in which—

Figure 1:
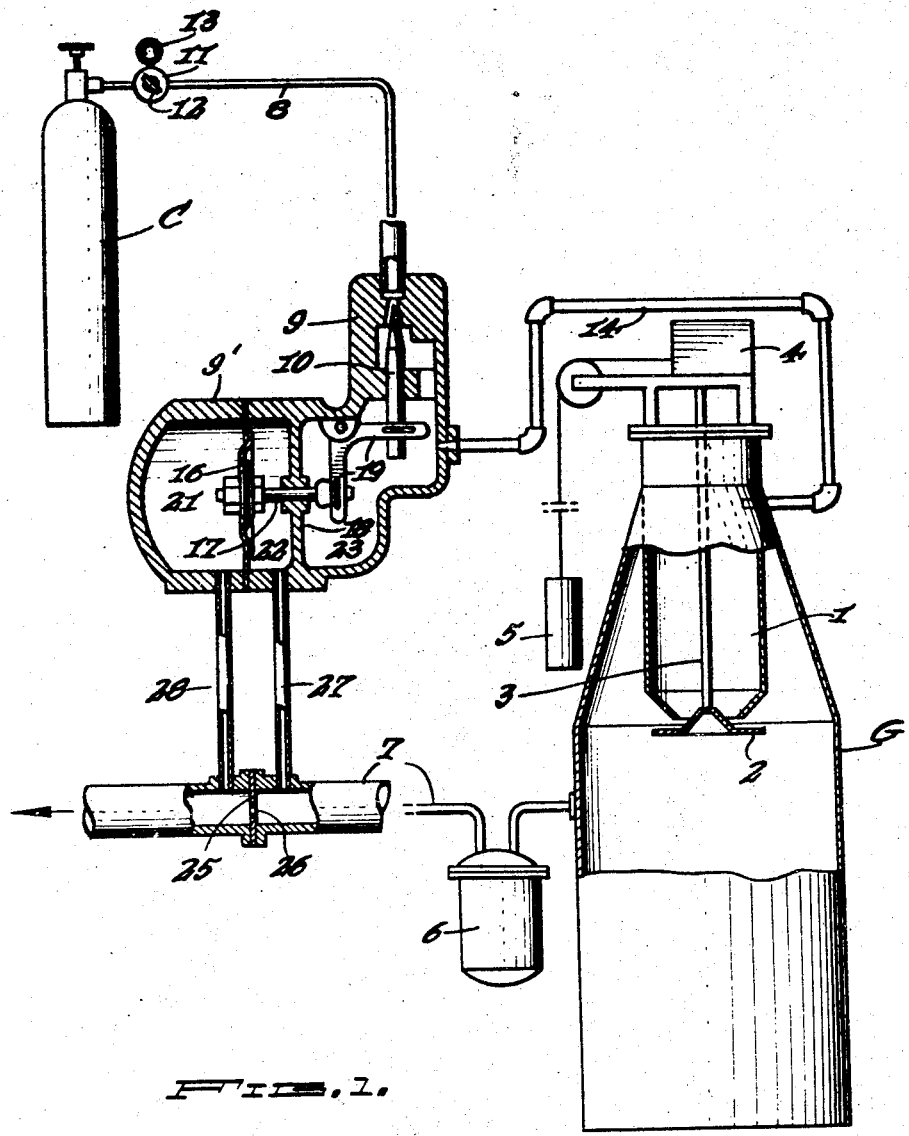
Figure 2:
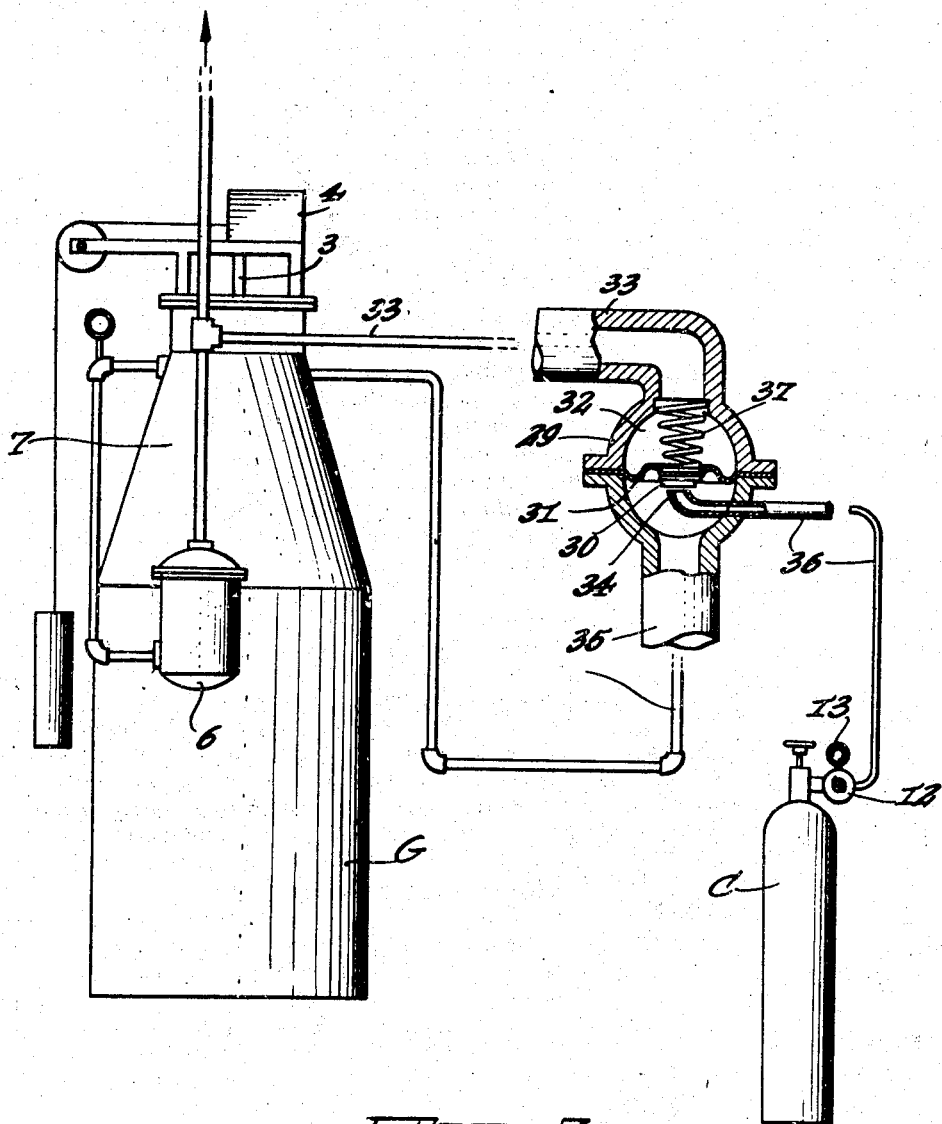

Figure 1 diagrammatically illustrates one form of the apparatus in which the introduction of propane or other gas into the acetylene generator is responsive to the rate of flow of acetylene from the generator, certain parts being shown in vertical section;

Figure 2 is a diagrammatic illustration of another form of apparatus in which the introduction of propane or other gas into the generator is responsive to the flow of acetylene from the generator, but not to its rate of flow, certain parts being shown in vertical section;

Figure 3 diagrammatically illustrates still another form of the invention in which the introduction of propane or other gas into the generator is responsive to the operation of the carbide feed mechanism; and Figure 4 shows how the centrifugal governor associated with the motor of the carbide feed mechanism may be utilized to actuate the propane valve.

Referring first to Fig. 1, the acetylene generator is represented at G. It has the usual feed hopper and rotary feed disc, represented diagrammatically at 1 and 2, for feeding carbide into the generator. The feed disc is mounted at the lower end of a rotatable shaft 3 which, in the type of generator shown in the drawings, is turned by a weight motor within the housing 4 mounted on top of the generator and operated by a weight 5, in a manner well understood in the art. Acetylene is withdrawn from the generator through the usual hydraulic check valve and flash arrester represented at 6. The discharge pipe through which the acetylene passes after leaving the hydraulic check valve is represented at 7.

Propane or other gas to be introduced into the acetylene generator may be supplied from a pressure cylinder represented at C or from any other suitable source from which it can be supplied under appropriate pressure. The propane is delivered from the cylinder C through a pipe 8 to the housing 9 of a valve 10 which controls the introduction of propane into the generator. It is of course necessary for the pressure of the propane to be higher than that of the acetylene in order for the propane to flow into the generator against the acetylene pressure, but if the propane is obtained from a high pressure cylinder such as that shown at C, the pressure of the propane would of course be entirely too high, so a pressure regulator represented at 11 is preferably employed, which is adjusted by the handle 12 until the propane pressure is stepped down to the desired level, as indicated by the usual gauge 13.

After passing the valve 10 the propane flows from the valve housing to the acetylene generator through a pipe 14 which preferably introduces the propane into the feed hopper of the generator as indicated in the drawing. The propane valve 10 is controlled by a diaphragm 16 clamped in an extension 9' of the valve housing, and connected to a rod 17 that slides in an opening through a partition 18. One end of the rod 17 is operatively connected to the propane valve by means of a bell crank lever 19. The diaphragm 16 and partition 18 divide the housing extension 9' into three compartments 21, 22 and 23.

For the purposes of the invention there is provided in the acetylene discharge pipe 7 a disc 25 having an orifice 26 that produces a pressure drop on opposite sides of the disc which varies with the rate of flow of the acetylene through the pipe 7. The interior of the acetylene pipe 7 at the upstream side of the disc 25 is placed in communication with compartment 22 by means of a tube 27. The interior of the acetylene pipe at the downstream side of the disc 25 is placed in communication with the end compartment 21 by a tube 28.

It will now be seen that the propane valve 10 is responsive to the rate of flow of acetylene through the discharge pipe 7, since the greater the flow, the greater will be the pressure drop on opposite sides of the disc 25 and the greater will be the differential pressure on opposite sides of the diaphragm 16, and consequently the greater will be the extent to which the propane valve is opened to admit propane to the generator.

In the modification of the invention shown in Figure 2, the valve is also responsive to the flow of acetylene from the generator, but it is not responsive to its rate of flow as in Figure 1. The propane valve is either open all the way or closed all the way, and the propane supply is set for an average delivery rate. The propane valve is in a housing represented at 29. The valve proper is shown at 30. It is connected to a diaphragm 31 which divides the interior of the housing 29 into two compartments, one of which, indicated at 32, is in communication with the acetylene discharge pipe 7 by means of a pipe 33. The other compartment indicated at 34 communicates with the interior of the generator by means of a pipe 35. Propane is supplied from the cylinder C to the compartment 34 through a pipe 36, the discharge end of which is controlled by the valve 30. A coil spring 37 biases the valve toward closed position, i. e. toward the position in which it closes the discharge end of the propane pipe 36.

When acetylene flows from the generator through the pipe 7 there is a reduction in pressure in the compartment 32 of the propane valve housing and when such pressure reduction reaches a predetermined amount the pressure differential established at opposite sides of the diaphragm opens the valve 30 to permit the flow of propane from the pipe 36 into the compartment 34 and thence through the pipe 35 into the acetylene generator.

In the modification of the invention shown in Figures 3 and 4 the propane supply is also set for an average delivery rate, the propane valve being either open to permit flow of propane into the generator at the average rate, or shut to permit no flow at all. The propane valve is shown at 38 (Figure 4). It is positioned in a housing 39 having a propane inlet pipe 40 and a propane outlet pipe 41. The valve is biased toward closed position by coil spring 42. The inlet pipe 40 delivers propane from the cylinder C (Figure 3) to the valve housing 39, but as the valve 38 is normally closed, it prevents introduction of propane into the generator through the pipe 41. The propane valve 38 is operatively connected to the centrifugal governor associated with the motor of the carbide feed mechanism. As shown in Figure 4, the governor has weights 43, each of which is pivoted at 44 to a member 45 that rotates with the governor shaft 46. This shaft is located within the above described housing 4 which houses the weight motor, the approximate position of the shaft, when the housing is viewed from the side, being indicated in Figure 3. As is well understood in the art, the governor shaft is rotated by the weight motor and controls the speed of rotation of the carbide feed disc 2 previously described in connection with Figure 1. When the governor shaft 46 attains a predetermined speed of rotation, the weights 43 fly out by centrifugal force against the action of coil springs 47 and move brake shoes 43' against a disc 48. This disc is mounted so that it cannot rotate, and in standard equipment is fixed against axial movement also, but for the purpose of the present invention it is mounted for limited axial movement. When the brake shoes 43' are pressed against the disc 48 with sufficient force, the disc is moved axially on the governor shaft 46 (downwardly as viewed in Figure 4) against the action of a coil spring 49. This axial movement of the disc is limited by a stop collar 50 secured to the shaft 46. The axial movement of the disc 48 caused by the pressure of the brake shoes 43' upon it is utilized to open the propane valve by means of a lever 51 which may be pivoted at 52 to the valve housing 39. As shown in Figure 4 one end of the lever 51 bears against the disc 48 and the other end engages the stem 53 of the propane valve 38.

When acetylene is withdrawn from the generator and causes the feed mechanism to feed carbide into the generator in a manner well understood in the art, the weights 43 of the centrifugal governor will be actuated to maintain the speed of operation of the weight motor substantially constant. As above described, the weights 43 in moving outwardly about their pivots 44 will move the disc 48 axially, and through the lever 51 will open the propane valve 38 to introduce propane into the generator. When withdrawal of acetylene from the generator is discontinued, or is reduced to a very small amount, immediately or soon thereafter the weight motor is automatically thrown out of action to discontinue the feed of carbide into the generator, as is well understood, and the centrifugal governor then allows the propane valve 38 to close.

It will now be seen that in all forms of the invention the propane is introduced into the generator automatically during periods which coincide, at least approximately, with the periods when there is an acetylene demand on the generator; otherwise, there would be danger of mixing excessive amounts of propane with the acetylene and the flame characteristics of torches supplied with gas from the generator would be adversely affected. 10% of propane is sufficient for commercial generators to minimize explosion hazard. Preferably, the apparatus functions to open the propane valve only when the acetylene demand rises to a certain level. This is more desirable in the form of apparatus shown in Figures 2 to 4 (in which the propane valve is either all the way open or all the way closed) than in the form of apparatus shown in Fig. 1 in which the propane valve is actuated in response to the rate of flow of acetylene from the generator. In the types of apparatus shown in Figures 1 and 2 the propane valve closes to discontinue the supply of propane to the generator as soon as the acetylene demand ceases or is reduced to a certain low level. This is also true of the type of apparatus shown in Figures 3 and 4 if the carbide feed mechanism and the centrifugal governor stop functioning as soon as withdrawal of acetylene from the generator is discontinued, but ordinarily there is a short lag in the operation of the carbide feed mechanism so that it may continue to function for a brief period of time after the flow of acetylene from the generator ceases. Even so, in this type of apparatus, the propane is supplied to the generator during periods which coincide approximately with the periods of acetylene demand.

Any other gas which will sufficiently reduce the explosion hazard may be introduced into the generator by the apparatus herein described, but propane is preferred because it is inexpensive and widely available. Whatever gas is introduced should, of course, be one that can be used under the operating conditions for which the acetylene is used. If the acetylene is used as a fuel gas to be supplied to cutting and welding torches, the gas introduced may be either propane or any other fuel gas which will raise the disassociation pressure of the acetylene, such as butane or methane. If the acetylene is used for purposes where an inert diluent is not objectionable, nitrogen or some other similar inert gas may be introduced if it has the desired effect of raising the disassociation pressure of the acetylene or reduces the explosion hazard in some other way. When propane is used, the apparatus herein described is preferably designed to control its introduction into the generator in such a way that there is maintained admixed with the acetylene in the generator about 10% of propane, as previously stated, but with some gas other than propane a different percentage may be desirable.

I claim:

1. The combination with an acetylene generator having carbide feed mechanism including a motor controlled by a centrifugal governor, of a source of gas to be admitted to the generator, a valve controlling the admission of such gas to the generator, and connections between said governor and the valve whereby the valve is controlled by the rotation of the governor.

2. The combination with an acetylene generator and the means by which acetylene is generated therein, of a source of gas capable when mixed with the acetylene in the generator of reducing the explosion hazard as by raising the disassociation pressure of the acetylene, and means in addition to the means for generating acetylene in said generator for automatically admitting gas from said source to the generator during periods which coincide approximately with the periods when there is an acetylene demand on the generator.

3. The combination with an acetylene generator and the means by which acetylene is generated therein, of a source of gas capable when mixed with the acetylene in the generator of reducing the explosion hazard as by raising the disassociation pressure of the acetylene, and means in addition to the means for generating acetylene in said generator for automatically maintaining in admixture with the acetylene in the generator approximately a predetermined percentage of gas from said source.

4. The combination with an acetylene generator and the means by which acetylene is generated therein, of a source of gas capable when mixed with the acetylene in the generator of reducing the explosion hazard as by raising the disassociation pressure of the acetylene, a valve controlling the admission of such gas to the generator, and means in addition to the means for generating acetylene in the generator operating automatically when acetylene is being withdrawn from the generator to open said valve.

5. The combination with an acetylene generator and the means by which acetylene is generated therein, of a source of gas under pressure capable when mixed with the acetylene in the generator of reducing the explosion hazard as by raising the disassociation pressure of the acetylene, piping leading from said source of gas to the interior of the generator, a valve controlling the passage of said gas through the piping to the generator, and means in addition to the means for generating acetylene in the generator operating automatically when acetylene is being withdrawn from the generator to open said valve.

6. The combination with an acetylene generator having means by which acetylene is generated therein and having an acetylene discharge pipe, of a source of gas capable when mixed with the acetylene in the generator of reducing the explosion hazard as by raising the disassociation pressure of the acetylene, a valve controlling the admission of such gas to the generator, and means in addition to the means for generating acetylene in the generator responsive to the flow of acetylene through said discharge pipe for controlling said valve.

7. The combination with an acetylene generator having means by which acetylene is generated therein and having an acetylene discharge pipe, of a source of gas capable when mixed with the acetylene in the generator of reducing the explosion hazard as by raising the disassociation pressure of the acetylene, a valve controlling the admission of such gas to the generator, and means in addition to the means for generating acetylene in the generator responsive to the rate of flow of acetylene through said discharge pipe for controlling said valve.

8. The combination with an acetylene generator having means by which acetylene is generated therein and having an acetylene discharge pipe, of a source of gas capable when mixed with the acetylene in the generator of reducing the explosion hazard as by raising the disassociation pressure of the acetylene, a valve controlling the admission of such gas to the generator, and pressure responsive means in addition to the means for generating acetylene in the generator for actuating said valve, said means being in communication with said discharge pipe and responsive to the flow of acetylene through it.

JOHN J. CROWE.

REFERENCES CITED

The following references are of record in the file of this patent:

UNITED STATES PATENTS

| Number | Name | Date |
|---|---|---|
| 2,309,701 | Kehl | Feb. 2, 1943 |
| 1,902,757 | Boley | Mar. 21, 1933 |
| 1,573,079 | McKee | Feb. 16, 1926 |
| 1,671,751 | Sullivan | May 29, 1928 |
| 1,096,245 | Jenkins | May 12, 1914 |

FOREIGN PATENTS

| Number | Country | Date |
|---|---|---|
| 3,791 | Great Britain | Of 1903 |